US007282170B2

(12) United States Patent
Dutmer et al.

(10) Patent No.: US 7,282,170 B2
(45) Date of Patent: Oct. 16, 2007

(54) THERMOPLASTIC THROTTLE BODY

(75) Inventors: Gerrit H. Dutmer, Sittard (NL); Jong-Eon Lim, Seoul (KR)

(73) Assignee: DSM IP Assets B.V., TE Heerlen (NL)

( * ) Notice: Subject to any disclaimer, the term of this patent is extended or adjusted under 35 U.S.C. 154(b) by 82 days.

(21) Appl. No.: 10/468,897

(22) PCT Filed: Mar. 4, 2002

(86) PCT No.: PCT/NL02/00140

§ 371 (c)(1),
(2), (4) Date: Jan. 15, 2004

(87) PCT Pub. No.: WO02/070881

PCT Pub. Date: Sep. 12, 2002

(65) Prior Publication Data

US 2004/0104373 A1 Jun. 3, 2004

(30) Foreign Application Priority Data

Mar. 5, 2001 (EP) ................................. 01105291

(51) Int. Cl.
*B29C 45/00* (2006.01)
*F02D 9/08* (2006.01)

(52) U.S. Cl. ................................. 264/328.18; 251/305

(58) Field of Classification Search ................ 264/250, 264/328.18; 251/305
See application file for complete search history.

(56) References Cited

U.S. PATENT DOCUMENTS

| | | | | |
|---|---|---|---|---|
| 4,418,172 | A * | 11/1983 | Kasuga et al. | 524/292 |
| 4,486,561 | A * | 12/1984 | Chung et al. | 524/107 |
| 5,089,553 | A * | 2/1992 | Umeda et al. | 524/424 |
| 5,188,078 | A * | 2/1993 | Tamaki | 123/403 |
| 5,723,520 | A * | 3/1998 | Akkapeddi et al. | 523/455 |
| 6,451,238 | B1 * | 9/2002 | Suzuki et al. | 264/250 |
| 6,692,675 | B2 * | 2/2004 | Schraudolf et al. | 264/242 |
| 6,764,062 | B1 * | 7/2004 | Daly | 251/305 |
| 6,800,685 | B1 * | 10/2004 | Yoshihara et al. | 524/451 |

FOREIGN PATENT DOCUMENTS

| | | |
|---|---|---|
| EP | 926336 | 6/1999 |
| EP | 1065360 | 1/2001 |
| FR | 2687601 | 8/1993 |

OTHER PUBLICATIONS

McLeod, M.A. et al., “Injection Molding Of Thermoplastics Reinforced with Pregenerated TLCP Fibrils”, ANTEC 1997 Platics : Plastics Saving Planet Earth, vol. 2:Materials, Society of Plastics Engineers Publishers, 1997, seven pages.*

DuPont Engineering Polymers Product Information,“The Engineering Polymers Portfolio: It Helps You Succeed”, 2000, pp. 1-13.*

DuPont Product and Properties Guide, Rynite PET,1995, pp. 1-6.*

* cited by examiner

*Primary Examiner*—Jill L. Heitbrink
(74) *Attorney, Agent, or Firm*—Nixon & Vanderhye P.C.

(57) ABSTRACT

The invention relates to a process of making a throttle body comprising injection-moulding of a reinforced thermoplastic composition, wherein a polyethylene terephthalate composition containing a nucleating agent and 25-60 mass % of glass-fibres is used as the reinforced thermoplastic composition. Advantages of the throttle body obtainable by the process according to the invention include excellent dimensional tolerances and stability, significant weight reduction of the body, and improved fuel efficiency of an internal combustion engine equipped with an air-intake assembly comprising a throttle body according to the invention.

10 Claims, No Drawings

THERMOPLASTIC THROTTLE BODY

CROSS REFERENCE TO RELATED APPLICATIONS

This application is the National Phase of International Application PCT/NL02/00140 filed Mar. 4, 2002 which designated the U.S., and is hereby incorporated in its entirety by reference.

The invention relates to a process of making a throttle body for use in an air-intake assembly of an internal combustion engine, comprising injection moulding of a reinforced thermoplastic composition. The invention also relates to a throttle body comprising at least a housing made of a specific thermoplastic composition, and to an air-intake assembly, comprising such a throttle body.

Such a process is known from EP 0926336 A2. In this publication a throttle body is formed from a reinforced thermoplastic material having a high (e.g. greater than 40%) glass/mineral content, which can sustain continuous high temperatures of 125° C., is chemically resistant to common automotive fluids, is generally non-hydrophobic with water absorption rates less than about 1.5%, is dimensionally stable, and is preferably of lower cost and lighter than metals. Preferably, polybutylene terephthalate or polyphenylene sulphide is employed as the thermoplastic material.

Conventionally, a throttle body and an air-intake manifold, as parts of an air-intake assembly, were made from metals such as aluminium or steel. Such metal components are generally heavier and costlier than desirable. Consequently, plastic materials have been evaluated for their potential to offer both cost and performance benefits. But while plastic air-intake manifolds have come widely into use, throttle bodies are generally still made of metal.

A drawback of the thermoplastic throttle body known from EP 0926336 A2 is its insufficient dimensional tolerance and stability. Dimensional tolerances and stability are essential properties in this application, because even very small differences in dimensions between throttle bodies produced in a series, or minor dimensional changes in a throttle body as a result of for example changing environmental conditions during use may hamper accurate metering of air flow during engine operation, or induce leaks in connections between the throttle body and air-intake manifold or air-duct to air-cleaner.

The object of the invention is therefore to provide a process for making a thermoplastic throttle body, which throttle body does not, or at least to a much lesser extent, show these disadvantages.

This object is achieved with a process wherein the throttle body is injection-moulded from a polyethylene terephthalate composition containing a nucleating agent and 25-60 mass % of glass-fibres as the reinforced thermoplastic composition.

It is surprising that the process according to the invention solves said problem, because polyethylene terephthalate compositions are known to be more difficult to injection-mould than e.g. polybutylene terephthalate compositions.

Another advantage of the process according to the invention is that it allows more design freedom than when making a throttle body from a metal. In case a throttle body design is used that is similar to a part made from metal, the present process allows a significant weight reduction, for example of about 60%. Another advantage is that a part can be moulded with a very good and smooth surface appearance. A surprising and important advantage of the throttle body obtainable by the process according to the invention is that a significant reduction in fuel-consumption is possible for a passenger car in which the air-intake assembly comprises a throttle body according to the invention.

The effect of the invention is already obtained with a throttle body comprising at least a housing that is moulded from the polyethylene terephthalate composition, and other components of the throttle body, like a valve element and shaft for selectively controlling the airflow to the air-intake manifold, made from other materials, like a metal. More preferably, the throttle body housing and the valve element are made from a polyethylene terephthalate composition, most preferably from the same polyethylene terephthalate composition, optionally containing a lubricant. The advantages thereof include lower manufacturing costs, reduced wear between the parts and more accurate operation under changing environmental conditions. Different designs or types of throttle housing bodies and valve elements may be used, including a conventional housing in which a butterfly-type valve is rotatably mounted. An advantage of using the polyethylene terephthalate composition is that also relatively thin moulded parts still show high strength and stiffness.

The polyethylene terephthalate composition that is used in the process according to the invention contains as a matrix polymer a polyethylene terephthalate polymer, i.e. a polyester based on terephthalic acid or an ester thereof and ethylene glycol as main monomers. The polyethylene terephthalate can also contain small amounts of other diacids, like isophtalic acid, or other diols, like diethylene glycol as comonomers. Preferably the composition contains at least a polyethylene terephthalate homopolymer. A polyethylene terephthalate homopolymer is herein understood to contain less than 5 mole % of monomers other than terephthalic acid or an ester thereof and ethylene glycol. The advantage of such a homopolymer is a higher melting point and better crystallisation behaviour. More preferably the polyethylene terephthalate contains less than 4 mol %, even more preferably less than 3 mol % and most preferably less than 2 mol % of comonomer. Preferably at least 50 mass % of polyethylene terephthalate in the composition is a homopolymer, most preferably at least 75 mass %. The composition may further contain a polyethylene terephthalate copolymer containing more than 5 mole % of other monomers, like the type of polymer used for making bottles. Such polymers may be used as virgin grades, but also as recycled grades, that is material recovered from post-use products, e.g. soft-drink bottles.

As a nucleating agent in the polyethylene terephthalate composition that is used in the process according to the invention, any known nucleating agents can be used. Preferably, an inorganic additive like micro-talcum, or a metal-carboxylate, especially an alkalimetal-carboxylate like sodium benzoate is used. More preferably, an alkalimetal-carboxylate like sodium benzoate is used in an amount of from about 0.05 to 0.5 mass % (based on polyethylene terephthalate).

Suitable glass fibres for use as reinforcing agent in the polyethylene terephthalate composition that is used in the process according to the invention generally have a fibre diameter of from 5 to 20 μm, preferably 8-15 μm, and most preferably 9-11 μm for optimal balance of mechanical properties, like stiffness, strength and toughness, and processability. The glass fibres have a sizing on their surface that is compatible with thermoplastic polyesters and generally contains an epoxy- or amino-functional compound. Preferably the sizing contains an epoxy-functional compound. The advantage thereof is a good dispersability in polyethylene terephthalate and improved long-term mechanical properties of the polyethylene terephthalate composition, especially improved fatigue behaviour.

In a preferred embodiment of the process according to the invention, the polyethylene terephthalate composition contains 28-50 mass % of glass fibres, more preferably 30-45 mass % of glass fibres, and even more preferably 33-38 mass % glass fibres. The advantage hereof is a more balanced compromise between high strength and stiffness, a low relative density and easy processing behaviour of the polyethylene terephthalate composition.

In a special embodiment of the process according to the invention, the polyethylene terephthalate composition has an average glass content of between 25 and 60 mass %, which average glass content shows a standard deviation of not more than 0.6% between different lots and between samples taken from one lot of polyethylene terephthalate compositions, and thus also between different parts moulded from these compositions. Typical lot sizes as produced are from about 5000 to 25000 kg. Preferably this standard deviation is not more than 0.5%, more preferably not more than 0.4%, and most preferably not more than 0.3%. The inventors found that a process in which a polyethylene terephthalate composition with such narrow distributions in the glass fibres content is used, a very good performance in dimensional tolerances of throttle bodies is obtained. In addition to enabling a constant and reproducible relative density of the composition and products moulded thereof, little variation in glass fibres content probably also results in little fluctuation in melt viscosity of the composition, and thus in a very stable injection moulding process, i.e. in little fluctuations in pressures, temperatures etc. This is not only advantageous for minimising degradation of the polyethylene terephthalate composition during the moulding process, but also for controlling crystallinity, density, dimensions and residual stresses of the moulded part obtained.

Generally the polyethylene terephthalate in the polyethylene terephthalate composition has a relative solution viscosity (RSV, determined on a solution of 1 gram polymer in 125 grams of a 7/10 (m/m) trichlorophenol/phenol mixture at 25° C.; method based on ISO 1628-5) of from 1.50 to 2.00, preferably 1.55-1.90, more preferably 1.60-1.85, and most preferably 1.65-1.80. In general, a higher RSV will result in improved strength and toughness of a moulded composition, whereas a lower RSV promotes melt flow and crystallisation speed of a composition. With the present RSV range an optimum in performance is reached, without the need for adding impact-modifiers or flow-promoters. In order to arrive at these RSV values, the polyethylene terephthalate composition may have been post-condensed in the solid state after mixing the various components of the composition, for example by exposing the composition in granular form to an elevated temperature of up to about 10° C. below its melting point, in an inert atmosphere during several hours. Another advantage of such a solid state post-condensation is that any volatiles present in the composition, and that may affect processing behaviour of the composition or properties of a part moulded thereof, are substantially removed.

The polyethylene terephthalate composition that is used in the process according to the invention is preferably substantially free of plasticizers, i.e. it preferably contains no additives that lower glass transition temperature and therewith the temperature range in which crystallisation from the melt occurs. The advantage hereof is that also during continuous use at elevated temperature the properties of an injection-moulded part will not change due to loss of plasticizer.

As a consequence of the absence of plasticizers, the polyethylene terephthalate composition is preferably injection-moulded into a mould that is kept constant at a relatively high temperature, of up to about 170° C., in order to obtain moulded parts of high crystallinity and excellent dimensional stability. Because of practical and technical considerations a lower mould temperature would be preferred. In the process according to the invention, the mould is therefore preferably heated at a temperature between 110 and 170° C., more preferably at 125-160° C., even more preferably at 130-150° C., and most preferably at 135-145° C.

The polyethylene terephthalate composition that is used in the process according to the invention may also contain 0-20 mass % of other fibrous or particulate mineral fillers. Preferably filler particles are used, for example talcum or kaolin, because they contribute to the stiffness of the composition without undesirably enhancing anisotropy in properties of the composition.

The polyethylene terephthalate composition that is used in the process according to the invention can also contain minor amounts of usual additives, like stabilisers and antioxidants, colorants, processing aids like a mould-release agent, viscosity-modifiers like a chain extension agent, impact-modifiers, lubricants, etcetera. Examples of suitable impact-modifiers include rubbery olefinic copolymers functionalised with reactive groups, for example with epoxy-groups; copolymers of olefins and (meth)acrylates, eg. ethylene/acrylic acid copolymers, that may optionally be partly neutralized; or polyester elastomers like a polyether ester block-copolymer. Suitable examples of lubricants or wear- and friction-reducing agents include fluorinated hydrocarbons like poly(tetrafluoro ethylene), graphite, or molybdenum disulfide.

The polyethylene terephthalate composition that is used in the process according to the invention can be made by mixing the various components using processes well known to the skilled person. Suitable mixing equipment includes a twin-screw compounding extruder to which the various components are metered separately or as a pre-blend. The molten mixture is extruded into a strand and granulated. The granulate may be used as such after drying, or undergo an additional post-condensation step in the solid phase in order to increase its viscosity.

In a most preferred embodiment of the process according to the invention a polyethylene terephthalate composition containing 0.05-0.5 mass % (based on polyethylene terephthalate) of sodium benzoate as a nucleating agent, 35 mass % of glass fibres, and with a RSV of 1.60-1.85 is injection-moulded into a mould that is kept at 135-145° C. The advantage is that a throttle body is obtained that shows very good dimensional tolerances and stability, high mechanical strength and stiffness, excellent fatigue behaviour at a temperature range of −40 up to over 100° C., and very good chemical and wear resistance.

The invention also relates to a throttle body for use in an air-intake assembly of an internal combustion engine, comprising at least a housing that is injection-moulded from a polyethylene terephthalate composition containing a nucleating agent and 25-60 mass % of glass-fibres. This novel throttle body shows advantageous properties as described above. Preferably, the main components of the throttle body, at least the housing and the valve element, are moulded from said composition.

The invention also relates to a throttle body for use in an air-intake assembly of an internal combustion engine, comprising at least a housing, obtainable by the process according to the invention. Injection moulding of said polyethylene terephthalate composition according to the process according to the invention has the advantage that the moulded products show very high consistency in performance. More preferably the main components of the throttle body are obtainable by the process according to the invention, i.e. at least the throttle body housing and its valve element.

The invention also relates to an air-intake assembly of an internal combustion engine, comprising a throttle body according to the invention. The advantage thereof is a better-balanced assembly of air-duct, throttle body and air-intake manifold, because of the lower mass of the throttle body. In addition, a car equipped with said air-intake assembly is found to show improved fuel efficiency. Preferably the air-duct and air-intake manifold are also made from a thermoplastic composition. The air-duct can be made from a polyamide, for example a polyamide 6 (PA 6), PA 66, or PA 46 composition, or from a block-copolyester composition, for example based on a segmented polyether ester block-copolymer. The air-intake manifold is generally made from a glass fibre reinforced polyamide, for example PA 6, PA 66, or PA 46 composition. It has been found that such an all-thermoplastic air-intake assembly shows less vibrational motions during use in a car, thereby resulting in an improved airflow.

The invention will now be further elucidated with reference to the following example.

EXAMPLE

A conventional throttle body housing design, which was normally made in aluminium, was slightly modified to accommodate for the use of a polyethylene terephthalate composition. Considering the lower thermal conductivity of such a polyethylene terephthalate composition versus metal, a cooling channel could for example be omitted. An injection-moulding tool was made, mounted in an injection-moulding machine, and heated at a constant temperature of 140° C. With cylinder temperature settings of 285-280-280-285° C. (from hopper to nozzle) a nucleated polyethylene terephthalate composition based on a polyethylene terephthalate homopolymer containing 0.15 mass % (based on polyethylene terephthalate) of sodium benzoate, reinforced with 35 mass % (based on the composition) of glass fibres of 10 μm diameter and with an epoxy-compound containing sizing system, Arnite® AV2 370/B of DSM Engineering Plastics (NL), which was previously dried to a water content of less than 0.03 mass %, was processed. The RSV amounted 1.73 (as determined on a solution of 1 gram polymer in 125 grams of a 7/10 (m/m) trichlorophenol/phenol mixture at 25° C.). Subsequently other components were mounted to the housing thus obtained. The weight of this thermoplastic throttle body amounted 190 grams, versus 460 grams for the original metal body. A weight reduction of about 60% was thus already obtained without optimising the housing design to the specific properties of the composition used.

The obtained throttle body was mounted between an air-duct and an air-intake manifold in a passenger car, and subjected to a standard test protocol. It was, amongst others, observed that the air pressure in the air-intake manifold was about 26.2 MPa versus 26.8 MPa for a control experiment with a conventional assembly without the throttle body according to the invention. The average distance driven on one litre of fuel in the present testing was 19.0 km/litre, whereas in the control experiment with a conventional assembly without the throttle body according to the invention average distance amounted 17.0 km/litre. This means a reduction in fuel consumption of almost 10% was realized, even without optimising the design of the throttle body and its components like the housing to the specific material and processing characteristics of the polyethylene terephthalate composition used.

The invention claimed is:

1. Process of making a throttle body comprising injection-moulding of a reinforced thermoplastic composition, wherein a polyethylene terephthalate composition containing a nucleating agent and 25-60 mass % of glass-fibres is used as the reinforced thermoplastic composition, and wherein the polyethylene terephthalate composition is substantially free of plasticizers.

2. Process according to claim 1, wherein a throttle body housing is injection-moulded from the polyethylene terephthalate composition.

3. Process according to claim 1, wherein a throttle body housing and a valve element are injection-moulded from the same polyethylene terephthalate composition.

4. Process according to claim 1, wherein the polyethylene terephthalate composition contains at least a polyethylene terephthalate homopolymer.

5. Process according to claim 1, wherein the polyethylene terephthalate composition contains 30-45 mass % of glass fibres.

6. Process according to claim 5, wherein the polyethylene terephthalate composition contains 33-38 mass % of glass fibres.

7. Process according to claim 1, wherein the polyethylene terephthalate composition has a relative solution viscosity of 1.60-1.85.

8. Process according to claim 1, wherein the polyethylene terephthalate composition is injected into a mould that is heated at 135-145° C.

9. Throttle body for use in an air-intake assembly of an internal combustion engine, comprising at least a housing that is injection-moulded from a polyethylene terephthalate composition containing a nucleating agent and 25-60 mass % of glass-fibres, and wherein the polyethylene terephthalate composition is substantially free of plasticizers.

10. Air-intake assembly of an internal combustion engine, comprising a throttle body according to claim 9.

* * * * *